United States Patent [19]

Almasi et al.

[11] 3,736,419

[45] May 29, 1973

[54] MAGNETORESISTIVE SENSING OF BUBBLE DOMAINS WITH NOISE SUPPRESSION

[75] Inventors: George S. Almasi, Purdy Station; George E. Keefe, Montrose, both of N.Y.

[73] Assignee: International Business Machines Corporation, Armonk, N.Y.

[22] Filed: Oct. 26, 1971

[21] Appl. No.: 192,547

[52] U.S. Cl. ........................340/174 EB, 340/174 TF

[51] Int. Cl. ..............................................G11c 11/14

[58] Field of Search ...................340/174 TF, 174 EB

[56] References Cited

UNITED STATES PATENTS 3,609,720 9/1971 Strauss............................340/174 TF

OTHER PUBLICATIONS

IBM Technical Disclosure Bulletin Vol. 14, No. 7, December, 1971 pg. 2139.

*Primary Examiner*—James W. Moffitt

*Attorney*—Jackson E. Stanland, Murray Nanes and J. Jancin, Jr.

[57] ABSTRACT

A magnetoresistive sensing device for detection of cylindrical magnetic domains (bubble domains) in magnetic bubble sheets. Cancellation of noise due to fields (such as the propagation (drive) field) which intercept the sensing element is achieved by using two magnetoresistive sensing elements whose combined voltage (or current) output is constant in the absence of a bubble domain. In one sensing element, the measuring current through the element is substantially parallel to the magnetization direction of that element, while in the second element, the measuring current is substantially perpendicular to the magnetization direction of the second element. In a preferred embodiment, two sensing elements are electrically connected in series and the sum of their resistances is constant when the device is being operated, in the absence of domains. When a domain is present, the sum of the resistances is different, so the output of the device changes. Each sensor can be associated with a different information channel (or group of channels) in which domains are propagated.

24 Claims, 5 Drawing Figures

INVENTORS
GEORGE S. ALMASI
GEORGE E. KEEFE

BY J. E. [signature]
AGENT

MAGNETORESISTIVE SENSING OF BUBBLE DOMAINS WITH NOISE SUPPRESSION

BACKGROUND OF THE INVENTION

1. Field of the Invention

This invention relates to improved magnetoresistive sensing of cylindrical magnetic domains, and more particularly to magnetoresistive sensors used together to achieve cancellation of noise due to magnetic fields such as the propagation field.

2. Description of the Prior Art

Magnetoresistive sensing of cylindrical magnetic domains (bubble domains) in magnetic sheets is known in the art, as can be seen by referring to copending applications Ser. No. 78,531, filed Oct. 6, 1970 in the name of G. S. Almasi, et al., (now U.S. Pat. No. 3,691,540) and Ser. No. 89,864, filed Nov. 16, 1970 and now abandoned in the name of G. S. Almasi, et al., both of which are assigned to the present assignee. A magnetoresistive sensing element has its magnetization vector rotated when the sensing element is magnetically coupled to the stray magnetic field of a domain. This in turn causes a resistance change in the sensing element which is ultimately detected as a voltage signal if a constant current flows through the sensing element or as a current signal if a constant voltage is impressed across the element. As is discussed in the aforementioned copending applications, magnetoresistive sensing of bubble domains offers many advantages, including easy fabrication and high signal-to-noise ratios.

Although magnetoresistive sensing can be used with any technique for propagating bubble domains, it is particularly useful when the propagation means utilizes deposited patterns of soft magnetic elements, such as permalloy T and I bars. In this case, the magnetoresistive sensing element can also be fabricated of the same material as the propagation pattern. However, the in-plane, rotating magnetic field used to move the domains (drive field) creates noise in the magnetoresistive sensing element since it tends to rotate the magnetization vector of the sensing element. The response of the sensing element to the drive magnetic field competes with the effect on the sensing element due to the stray field of the domains. Consequently, the signal-to-noise ratio is affected and inaccurate sensing may occur.

This noise problem was recognized in aforementioned copending application Ser. No. 78,531 in which it was stated that the sensing element should be properly placed with respect to the propagation means so that the drive field will have a minimum effect on the sensing element at the time the domain is being sensed. In general, it is desirable that there not be a component of the drive field transverse to the sensing element sufficient to saturate the element at the time the bubble domain is to be detected.

In aforementioned copending application Ser. No. 89,964, the magnetic drive field was used to advantage to tranversely bias the magnetoresistive sensing element to ensure that its response to the stray field of a domain is linear, thereby providing a greater output signal.

The prior art has also taught the use of series connected magnetoresistive sensing elements, as can be seen by referring to copending application Ser. No. 145,656, filed May 21, 1971 in the name of H. Chang, and assigned to the present assignee. In that application, a plurality of magnetoresistive sensing elements is connected in series, and spatially displaced from one another to provide time displaced output signals indicative of the information in a plurality of channels. This increases the data rate of the system. In that improved sensing technique, the problem of noise which occurs when a plurality of sensing elements is connected together is still present, however.

Accordingly, the present invention is a noise cancellation scheme which uses a plurality of magnetoresistive sensing elements to balance out noise produced by magnetic fields such as the drive propagation fields. In at least one direction of the drive field, the total resistance of the sensing device changes when a bubble domain is present. In a preferred mode, each magnetoresistive sensing element is associated with a different information channel and provides sensing of domains in its associated channel, as well as being used to provide noise cancellation for a magnetoresistive sensing element associated with another channel.

Accordingly, it is a primary object of this invention to provide an improved magnetoresistive sensing technique for detection of bubble domains, in which the adverse effect of the propagation field is minimized.

It is another object of this invention to provide an improved magnetoresistive sensing scheme which achieves noise cancellation without requiring additional fabrication steps.

It is still another object of this invention to provide magnetoresistive sensing of bubble domains in which noise cancellation is achieved in sensing elements associated with a plurality of information channels.

It is still a further object of this invention to provide an improved magnetoresistive sensing device for sensing bubble domains where noise cancellation results and a minimum number of interconnections is required.

SUMMARY OF THE INVENTION

Noise cancellation in a magnetoresistive sensing scheme for detection of bubble domains is achieved in an environment where magnetic fields, other than the bubble domain field, affect the magnetoresistive sensing element. Generally, it is the propagation field (drive field) used to move magnetic domains which adversely affects domain sensing and causes noise.

This sensing device comprises a plurality of magnetoresistive sensing elements (generally two elements) whose combined voltage or current output is constant in the absence of a bubble domain. That is, if a constant current is passed through the elements, the combined voltage outputs $(V_{s_1}+V_{s_2})$ of the elements is a constant when no bubble domain is present. If a constant voltage is impressed on the elements, the total current $(I_{s_1}+I_{s_2})$ passing through them is a constant, if no bubble domain is present.

In one sensing element, the measuring current through the element is substantially parallel to the magnetization direction of that element, while in the second sensing element the measuring current is substantially perpendicular (in the plane of the element) to the magnetization direction of the second element in the absence of magnetic fields. If desired, isotropic sensing elements can be used, although in preferred embodiments it is easier to use sensing elements having uniaxial anisotropy so that the magnetization directions are defined as being along an easy axis of each element.

Consequently, the preferred embodiment uses two magnetoresistive sensing elements in one of which the measuring current is substantially parallel to its easy axis, while in the other element the measuring current therethrough is substantially normal to its easy axis. For ease of construction, the easy axes of the two sensing elements are parallel.

If the two sensing elements are electrically connected in series, and a constant measuring current $I_s$ is passed through each, the resistance changes of the elements in the presence of magnetic bubble domains are manifested as voltage signals $V_s$. In this arrangement, the sum of the resistances of the elements will be constant in the absence of bubble domains.

One sensing element is located in a flux coupling relationship to the domains while the other is not. That is, a first sensing element is located close to the propagation path of the domains while the second element is removed from this path by at least about one bubble domain diameter. This is to insure that the second sensing element does not have its resistance substantially altered by the bubble domain field. The resistance of this second element should not be changed by the bubble domain field by an amount greater than a few percent of its maximum change $\Delta R$ due to saturating magnetic fields.

When a plurality of sensing elements are used for different information channels (which can include plural bubble domain paths), the magnetoresistive sensing elements are electrically connected in series and serve to cancel noise in one another. Each sensing element is used to sense domains in its own channel and to cancel noise in a sensing element associated with another channel.

The foregoing and other objects, features, and advantages of the invention will be apparent from the following more particular description of the preferred embodiments of the invention as illustrated in the accompanying drawings.

DETAILED DESCRIPTION OF THE PREFERRED EMBODIMENTS

Figure 1:
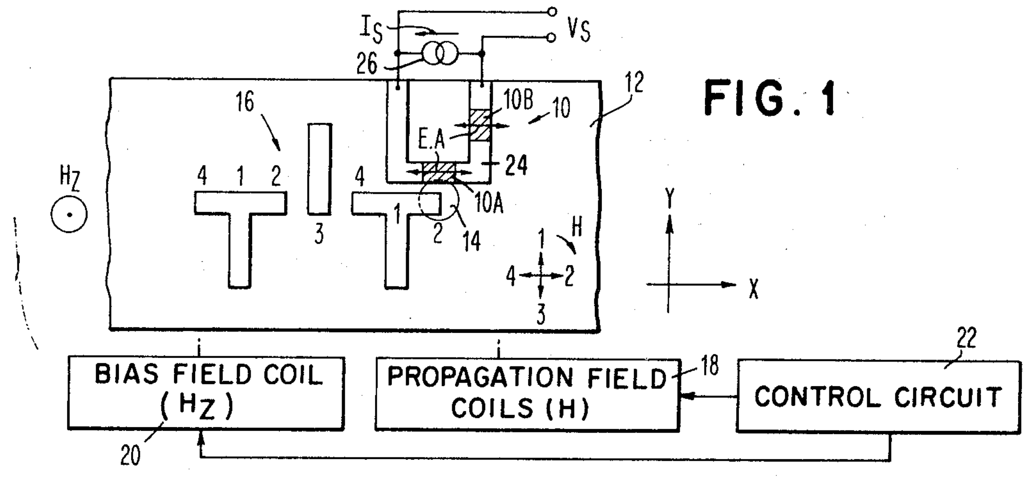
FIG. 1 is an illustration of an improved magnetoresistive sensing device for bubble domains in which noise cancellation is achieved.

In the preferred embodiments shown in the drawings, the sensing elements have uniaxial anisotropy with easy axes identified by arrows labeled E.A. and are connected in series electrical path for ease of fabrication and operability. However, it is to be understood that it is only important that the sum of the resistances of the sensing elements be constant in the absence of a bubble domain to be sensed. To achieve this, current through one sensing element is substantially normal to its magnetization direction and the current through the other sensing element is substantially parallel to the magnetization direction of this other sensing element, in the absence of magnetic fields.

FIG. 1 shows a bubble domain environment having an improved magnetoresistive sensing device 10 located on a magnetic sheet 12 in which domain 14 propagates. In this drawing, domains propagate along different poles of the propagation pattern 16 which is comprised of permalloy T and I bars. The propagation or drive field H is a rotating, in-plane magnetic field produced by, for instance, field coils 18. The bias magnetic field $H_z$ is normal to magnetic sheet 12 and is produced by, for instance, bias field coil 20. As is known in the art, bias field coil 20 can be replaced by a permanent magnet or another magnetic layer deposited on magnetic sheet 12 and exchange coupled thereto. Control circuit 22 is used to trigger the propagation field coils 18 and bias field coil 20.

The improved magnetoresistive sensing device 10 comprises a first magnetoresistive sensing element 10A and a second magnetoresistive sensing element 10B. These elements are made of magnetoresistive materials, preferably permalloy. Elements 10A and 10B are connected by a conductor 24, such as copper. Conductor 24 carries a measuring current $I_s$ from constant current source 26. The produce of the measuring current $I_s$ and the total resistance of sensing element 10A and 10B is the voltage output signal $V_s$. Sensing element 10A is located close to the propagation path defined by propagation means 16 and is closed enough to the propagation path to be magnetic flux-coupled to domains 14 passing thereby. Sensing element 10B is not in flux coupling relationship with domains 14, being a distance at least about one bubble domain diameter from the propagation path defined by propagation means 16. In a preferred embodiment for ease of fabrication, the easy axes of sensing elements 10A and 10B are parallel, the easy axis of element 10A being in the direction of current $I_s$ through the element. In this orientation, the direction of current $I_s$ in element 10B is normal to the easy axis of that element.

If each sensing element is in the same magnetic state with respect to the measuring current (that is, the magnetization vector M of each element is at the same angle with respect to the direction of current $I_s$) then the resistance of each is the same, when bubble domains are present and absent. In the device operating mode, the sum of the resistances of the elements is a constant if a bubble domain is not present.

The operation of a magnetoresistive sensing element for detection of bubble domains has been described previously in aforementioned copending application Ser. No. 78,531, and will not be described further here. Instead, reference will be made to FIGS. 2A and 2B to understand the combined operation of sensing elements 10A and 10B to effect noise cancellation.

Figure 2A:
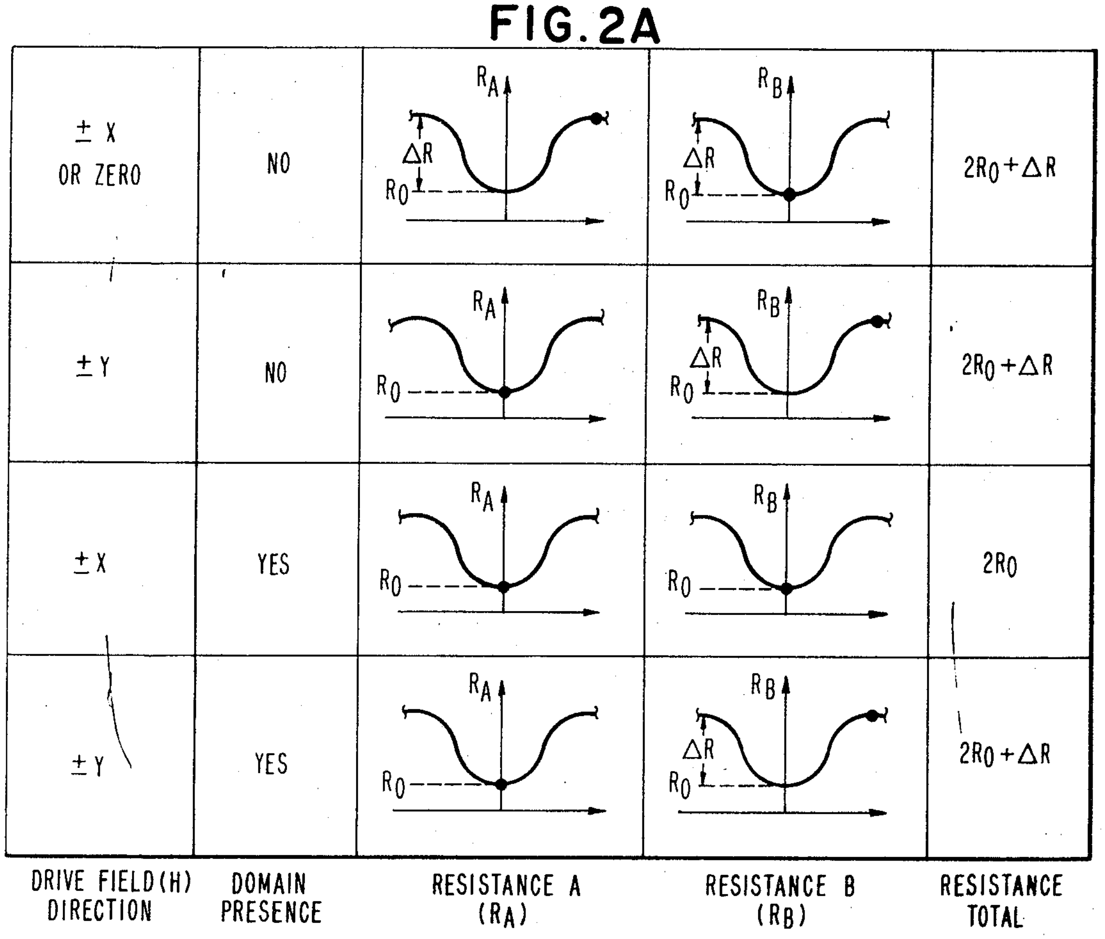
FIG. 2A is a table illustrating the operation of the sensing device of FIG. 1 for various magnetic drive field (H) orientations.
Figure 2B:
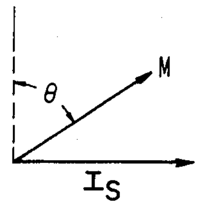
FIG. 2B is a vector diagram used to illustrate the angle $\theta$ which appears in FIG. 2A.

In FIG. 2A, the resistances $R_A$ and $R_B$ of sensing elements 10A and 10B, respectively, is shown as a function of the direction of drive field H, in the presence and absence of a domain 14. Also shown is the total resistance which is the numerical sum of the resistances $R_A$ and $R_B$. The angle $\theta_A$ is the complement of the angle between the magnetization vector M of sensing element 10A and the measuring current $I_s$ (FIG. 1). The angle $\theta_B$ is the complement of the angle between the magnetization vector M of element 10B and the current $I_s$ through element 10B. These angles are illustrated generally by FIG. 2B, where $\theta$ is the complement of the angle between $I_s$ and M. The Y direction is the direction of the stray field of the magnetic domain 14 which intercepts sensing element 10A and causes a rotation of the magnetization vector M of this element into a direction transverse to its easy axis direction.

The resistance of either sensing element is given by $R_A$ or $R_B = R_0 + \Delta R$, where $\Delta R = C\sin^2\theta_{A\ or\ B}$. That is, the resistance R of either sensing element is equal to a constant ($R_0$) plus a value which is dependent on the square of the sine of an angle $\theta$ which has been defined previously. The curves for $R_{A,B} = R_0 + \Delta R_{A,B}$ are plotted in the table for different values of $\theta$. The large dot on the curves indicates the resistance of the element for the particular value of $\theta$.

To understand the noise cancellation device 10 more fully, reference is made to FIG. 2A which shows the resistances $R_A$ and $R_B$ of sensing elements 10A and 10B, as well as the total resistance, for different orientations of the drive field (H) and for the presence and absence of bubble domains 14 which are in flux-coupling relationship to element 10A. In this chart, it is assumed that the magnitude of the drive field is sufficient to saturate the sensors 10A and 10B and that the stray field of the domain 14 is also sufficient to saturate element 10A. However, it should be recognized that this noise cancellation scheme operates identically the same way even if the magnitude of the drive field is such that the sensing elements 10A and 10B are not totally saturated. That is, this noise cancellation scheme provides a total resistance of sensing elements 10A and 10B which remains constant for all directions of drive field and which changes only when a bubble domain is sensed.

In more detail, the first row of the table in FIG. 2A shows the resistance $R_A$ and the resistance $R_B$ for elements 10A and 10B respectively, when the drive field H is in the ±X direction, or is 0. In this row of the table, no domain 14 is present in flux-coupling relationship to elements 10A. In this case, the angle $\theta_A$ is 90°, since it is the complement of the angle between the measuring current $I_s$ and the magnetization vector M of element 10A. Under these conditions of drive field and the absence of a domain, the magnetization vector of element 10A is along the direction of current $I_s$ through element 10A. The complement of the angle between $I_s$ and vector M is 90°. Therefore, the resistance $R_A$ is the resistance $R_0 + \Delta R$.

Turning now to the resistance $R_B$ for drive fields in the ±X direction, or O drive fields, the angle $\theta_B$ is 0, since the direction of current $I_s$ is at right angles to the magnetization vector M of element 10B, for this drive field orientation. Consequently, resistance $R_B$ is $R_0$. The total resistance is the algebraic sum of $R_A$ and $R_B$ and is $2R_0 + \Delta R$.

Referring to the next row of FIG. 2A, the magnetic drive field is in the ±Y direction and no bubble domain 14 is present in flux-coupling relationship to element 10A. For these conditions, $\theta_A$ is 0 (since $I_s$ and M of element 10A are at right angles to one another) and the resistance $R_A$ is $R_0$. In the case of sensing element 10B, the magnetization vector M is rotated to make it parallel to current $I_s$ through 10B and therefore the complement of this angle is 90°. Accordingly, resistance $R_B$ is $R_0 + \Delta R$. Combining resistances $R_A$ and $R_B$ yields a total resistance $2R_0 + \Delta R$.

Referring now to the third row of FIG. 2A, the drive fields are in the ±X direction and a domain 14 is present in flux-coupling relationship to element 10A. In this case, the magnetization vector M of element 10A is rotated to a direction normal to the current flow through 10A. The complement ($\theta_A$) of this angle is then zero. In this case the resistance $R_A$ of element 10A is $R_0$. However, in the case of element 10B, the angle between the magnetization vector of element 10B and the current $I_s$ through this element is 90° so that the complement of this is zero. Accordingly, the total resistance is $2R_0$.

Referring to the fourth row of FIG. 2A, the drive fields are in the ±Y direction and again a domain 14 is present in flux-coupling relationship to element 10A. This row is included in the table for completeness only, since a domain cannot be located in flux-coupling relationship to element 10A and H is in the Y direction, in the structure shown in FIG. 1. In this case, the complement of the angle between the measuring current $I_s$ through element 10A and the magnetization vector of element 10A is zero. Therefore, $R_A$ is $R_0$. In the case of element 10B, the magnetization vector of that element has been rotated to a direction which is parallel to the current direction through 10B. Accordingly, the angle $\theta_B$ is 90° and the resistance $R_B$ is $R_0 + \Delta R$. The total resistance $R_A + R_B$ is $2R_0 + \Delta R$.

Referring to the column entitled "Resistance Total" of FIG. 2A, it is readily apparent that the values of total resistance are identical except in the case when the drive field is in the X direction with a domain present in flux-coupling relationship to element 10A. Only in this case is the total resistance $2R_0$. Therefore, noise cancellation is achieved for all directions of the drive field and a sensing element responsive to domains which have been moved by a drive field in this direction will be free of noise. Although the sensing element 10A has been shown in a preferred placement, this element can be placed to sense domains at any orientation of the drive field H. For instance, sensing element 10A can be placed adjacent pole position 1 of the T bar, instead of near pole position 2 where it is located in FIG. 1. Noise cancellation will still occur. When element 10A is located near pole position 1, the field H will be transverse to element 10A and will tend to rotate the magnetization vector M. To overcome the effect of H, the magnetic field of the domain 14 is oppositely directed to H and should have a magnitude equal to H, so that the effect on element 10A is different when a bubble domain is present than when it is not. That is, element 10A is saturated for all other directions of magnetic field H, but is not saturated when H is in the +Y direction (direction 1).

FABRICATION PROCESS

The individual sensing elements 10A and 10B are fabricated in the same process to insure that they will have the same resistance with respect to $I_s$ and M as stated previously, in the absence of magnetic fields. Because these elements are located closely together, their thickness can be controlled to be the same for both elements. Since the thickness of elements 10A and 10B is the same, the sheet resistivity of these elements measured in ohms/square is the same, if the same relationship between length and width exists for each element.

This is easily controlled by the masks which are used to deposit the elements or by the etching steps used. Accordingly, it is quite simple to use conventional techniques to provide sensing elements 10A and 10B which have a constant combined resistance in the absence of magnetic fields.

In order to fabricate the bubble domain system shown in FIG. 1, a first film of permalloy is evaporated (or sputtered) to a thickness of 100–200 angstroms over the entire magnetic bubble sheet 12 in the presence of a magnetic field which determines the direction of the easy axis of magnetization. This will be used to provide sensing elements 10A and 10B. After this, the entire permalloy layer will be covered with photoresist which is subsequently exposed and developed. Portions of the photoresist are removed by a suitable solvent and then a 4,000–5,000 angstrom thick layer of permalloy is electroplated or electrolessly plated through the photoresist mask. The remaining photoresist is then removed by stripping. After this, a new layer of photoresist is put over the entire thick layer of permalloy and is exposed and developed to provide a photoresist mask. The mask includes the conductor pattern 24 used to contact sensing elements 10A and 10B. The conductor pattern is then electroplated using either copper or gold, for instance, and the remaining photoresist is stripped off.

After this, another new layer of photoresist is placed on the sensor area and over whatever other elements have to be protected. The reason for this is that the thin permalloy layer will be removed from the gaps between the T and I bars forming the propagation means 16. When removing the permalloy from between the T and I bars, copper must be protected if it is used for the conductor pattern. However, if gold is used only the sensing element need be protected since gold is not adversely affected by the etch used to remove the permalloy. This process insures that the sensing elements 10A and 10B have the same final thickness and therefore the same resistance in the absence of a magnetic field. In addition, the sensing elements have the same magnetic properties and are affected in the same way by magnetic fields.

SENSING OF INFORMATION CHANNELS

Figure 3:
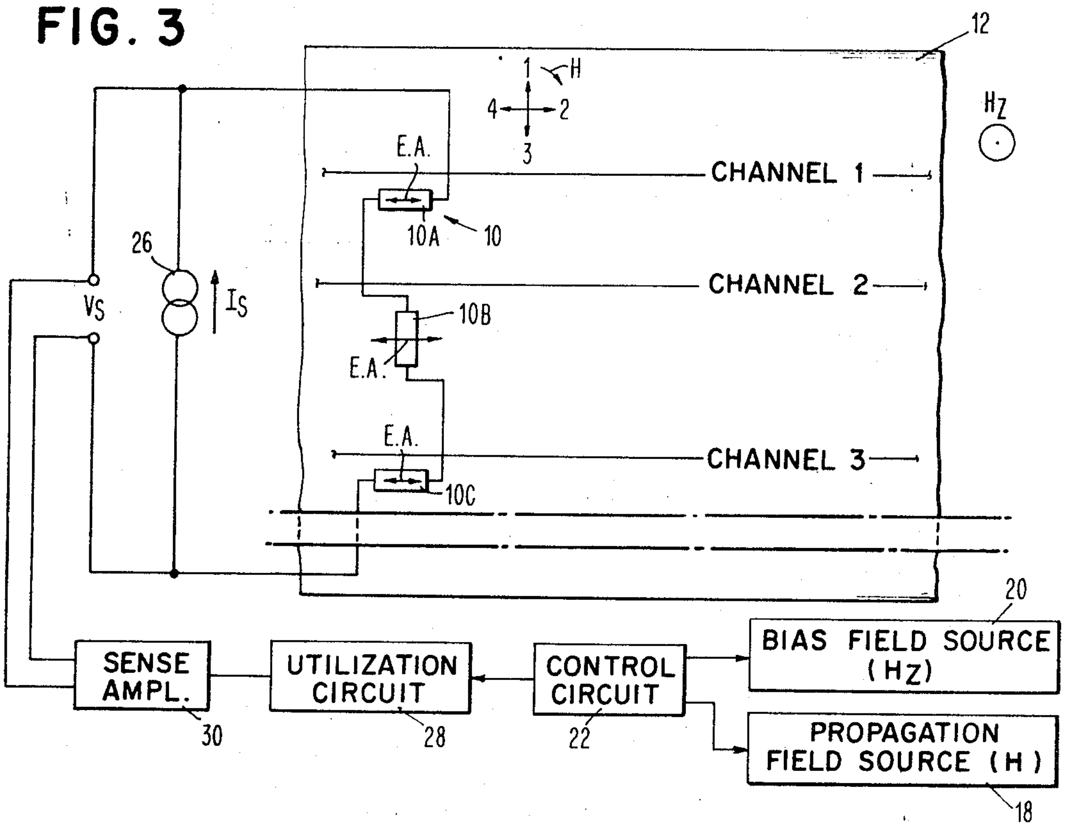
FIG. 3 is a diagram of a magnetoresistive sensing means which provides noise cancellation when a plurality of magnetoresistive sensing elements is used for numerous information channels.

In FIG. 3, many bubble domain information channels, 1, 2, 3, . . . exist on the magnetic sheet 12. The channels could be groups of channels which share common magnetoresistive sensing elements. Where possible, the same symbols will be used to designate elements in FIGS. 3 and 4 which are similar to those in FIG. 1. Accordingly, a plurality of information channels along which bubble domains travel are provided on magnetic sheet 12. These channels are defined by propagation means such as the T and I bars of FIG. 1. Not show in this drawing are the bubble domain generators which write information into the channels and the control loops which control the entry of data into each channel. These, however, are known in the art as can be seen by referring to copending application Ser. No. 103,046, filed Dec. 31, 1970, in the name of H. Chang et al., and assigned to the present assignee (now U.S. Pat. No. 3,701,125).

Located on magnetic sheet 12 is a magnetoresistive sensing device 10 comprising elements 10A, 10B, 10C, etc. The arrows (identified by the label E.A.) located in elements 10A–10C correspond to the easy magnetic axes of these elements. In this case, the easy axes of the elements are parallel which is easily provided during the fabrication process. As in the system of FIG. 1, a constant current source 26 provides measuring current $I_s$ which flows in series through sensing elements 10A–10C, etc. Element 10A senses domains in channel 1, element 10B senses domains in channel 2, and element 10C senses domains in channel 3. The various sensing elements are located with respect to one another such that no element is able to detect domains traveling in a channel other than the channel with which it is associated. That is, each sensing element is located at least about one domain diameter from each other information channel.

Domains propagate in the channels under the influence of the propagation magnetic field H which is provided by the propagation field source 18. A bias magnetic field $H_z$ exists normal to magnetic sheet 12 and is provided by the bias field source 20. Control circuit 22 provides inputs to trigger sources 18 and 20 as well as to trigger utilization circuit 28 which responds to the output of sense amplifier 30. That is, the control circuit coordinates the signal in the utilization circuit with the particular information channel being read. Sense amplifier 30 is responsive to the voltage $V_s$ developed across the sum of the sensing elements 10A, 10B, etc.

In FIG. 3, the noise cancellation element for each magnetoresistive sensing element is another magnetoresistive sensing element located in a propagation channel adjacent the channel from which information is being sensed. For instance, the noise cancellation element for sensing element 10A is element 10B which is associated with channel 2. This contrasts with the illustrative system of FIG. 1 in which element 10B provides noise cancellation but does not provide a domain sensing function of its own.

Figure 4:
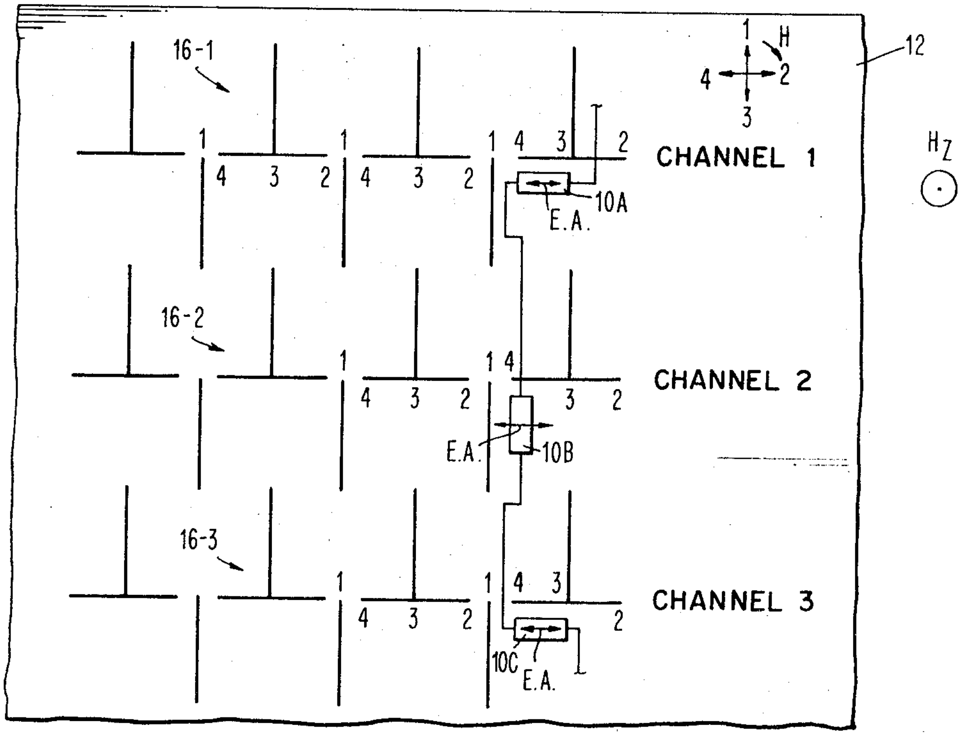
FIG. 4 is a more detailed diagram of a portion of the system of FIG. 3, showing the location of the sensing elements in relation to the propagation means used for each information channel.

FIG. 4 shows in detail a portion of the drive elements associated with the propagation channels 1, 2, and 3 of FIG. 3 and illustrates the layout of the sensing elements with respect to the propagation means of each channel. In FIG. 4, the propagation means 16-1 for channel 1 comprises T and I bar elements as are shown in FIG. 1. The propagation means 16-2 for channel 2, as well as the propagation means 16-2 for channel 3, are T and I bar elements also. In FIGS. 3 and 4, sensing elements 10A, 10B, and 10C are situated to provide sensing of magnetic domains when the domains are located near pole positions 4 of the T bar elements located adjacent the sensing elements. As is apparent from FIGS. 3 and 4, any even number of sensing elements 10 can be connected in series to provide information readout from a plurality of channels while at the same time providing noise cancellation of the effects of drive fields for a particular orientation of magnetic drive fields in which domain sensing is to occur.

In FIGS. 3 and 4, the information in the different information channels is sensed one channel at a time, so that there is always available a sensing element which does not have a domain next to it, which can be used to provide noise cancellation for another sensing element.

EXAMPLES

A typical example of suitable sensing elements 10A and 10B uses elements which are each 1 mil by 1 mil and have the same thickness (between 100 and 200 angstroms). As is mentioned in copending application Ser. No. 78,531 (U.S. Pat. No. 3,691,540), the length of a sensing element along the direction of travel of the domain is approximately the domain diameter in order to provide maximum efficiency. For sensing domains in garnet materials (these domains are 1–10 microns in diameter) sensing elements having length between 1 and 10 microns, width between 1 and 10 microns, and a thickness about 200A are suitable. Current $I_s$ in the range 1–10 mA will lead to voltage outputs $V_s$ in the range 0.1 mV – 1.0 mV.

The magnitude of the measuring current in the sensors is typically less than about 10 milliamps and is chosen so that the motion of the domains is not adversely affected by the magnetic field set up by the current $I_s$, nor is the element subjected to undue heating due to $I_s$. The voltage signal $V_s$ obtained from combined sensing elements is generally between 0.1 mV and 1 mV, although larger signals are possible.

What has been described is a noise cancellation device for magnetoresistively sensing domains in which the effect of magnetic drive fields is minimized whether or not bubble domains are present. Although it is most simple to use series connected sensing elements, the currents through the sensing elements can be provided by separate current sources. Further, it will be realized by one of skill in the art that the noise cancellation device described here can be used in conjunction with any propagaion means which produces magnetic fields that affect the sensing elements. For instance, this noise cancellation device will work for conductor loop systems in which the magnetic field produced by current flowing through a conductor loop adversely affects the operation of the sensing elements. In the case of conductor loops, the physical layout and interconnection of the various sensing elements is analogous to that shown in FIGS. 1 and 3.

In this sensing scheme, there are minimum interconnections and minimum hardware required, there being no more sensing elements than is required to conventionally sense a plurality of information channels. Resistance changes in the sensing device occur only when a bubble domain is in a position to be sensed, thereby producing a new voltage (or current) signal only at this time. Because of this, simplified detection circuitry such as a threshold detector can be used.

What is claimed is:

1. A sensing device for cylindrical magnetic domains, comprising:

a magnetic bubble sheet in which said domains exist, a first magnetoresistive sensing element in magnetic flux-coupling proximity to said domain, the current through said first element being substantially parallel to the direction of magnetization of said element in the absence of magnetic fields intercepting said element, a second magnetoresistive sensing element removed from substantial flux-coupling proximity to said domains, the current through said second element being in a direction substantially perpendicular to the direction of magnetization of said second element, current means for providing current to said sensing elements, where the sum of the resistances of said first and second magnetoresistive sensing elements is substantially constant in the absence of bubble domains in flux-coupling proximity to said first magnetoresistive sensing element.

2. The device of claim 1, where each said element is in the same magnetic state with respect to the current through each said element, the resistance of each element in this state being equal.

3. The device of claim 1, where said elements exhibit uniaxial anisotropy, the current through one element being substantially parallel to the easy axis of said one element and the current through said other element being substantially normal to the easy axis of said other element.

4. The device of claim 3, where said easy axes are parallel.

5. The device of claim 1, where said second magnetoresistive sensing element is sufficiently far from said domains that the magnetic field of said domains does not change the resistance of said second element more than a few percent of its maximum change in the presence of saturation magnetic fields.

6. The device of claim 5, where said second magnetoresistive element is at least about one bubble domain diameter from said domain which is in flux coupling relationship to said first magnetoresistive element.

7. The device of claim 1, where said magnetoresistive elements are comprised of permalloy.

8. The device of claim 1, where said first and second magnetoresistive elements are connected in a series electrical path.

9. The device of claim 1, further including additional magnetoresistive sensing elements each of which is associated with an information channel in which domains propagate, said additional elements being used to sense domains in said information channel.

10. The device of claim 1, further including a source for producing an in-plane, rotating magnetic field which causes said domain to propagate in flux-coupling proximity to said first sensing element.

11. A sensing device for detection of cylindrical magnetic domains, comprising:

a magnetic sheet in which said domains can be propagated, bias means for producing a magnetic field substantially perpendicular to said sheet for stabilizing said domains, first propagation means located adjacent said sheet for producing localized magnetic fields oppositely directed to said bias field for moving said domains in said sheet, a first magnetoresistive sensing element located adjacent said sheet and sufficiently close to said propagation means that it is intercepted by the stray field of domains being propagated thereby, a second magnetoresistive sensing element located sufficiently far from said propagation means that the stray magnetic field of a domain being moved by said propagation means causes less than a few percent change in the total resistance change of said second element when a saturation magnetic field intercepts said second element, current means for providing current to said first and second elements, the direction of current in one of said elements being substantially parallel to the magnetization direction of said element in the absence of magnetic fields intercepting said element, while the current direction in said other element is substantially normally to the magnetization direction in said other element in the absence of magnetic fields intercepting said other element, the sum of the resistances of said first and second elements being substantially constant in the absence of bubble domains in flux-coupling proximity to said first sensing element.

12. The device of claim 11, where said first and second elements exhibit uniaxial anisotropy, current in one element being substantially parallel to its easy axis while current in the other element is substantially perpendicular to its easy axis.

13. The device of claim 12, where said easy axes are parallel.

14. The device of claim 11, wherein said second sensing element is at least about one bubble domain diameter away from said domain when it is in a position to be sensed by said first sensing element.

15. The device of claim 11, where said sensing elements are comprised of permalloy.

16. The device of claim 11, where said first and second elements are electrically connected in series.

17. The device of claim 11, where said second magnetoresistive sensing element is located sufficiently near a second propagation path that it is in flux-coupling relationship to domains moved by said second propagation paths and senses these domains.

18. The device of claim 11, further including additional magnetoresistive sensing elements, each of which is associated with a different propagation path along which domains are moved, each of said additional sensing elements being in flux-coupling relationship to the domains in its associated propagation means.

19. A bubble domain system, comprising:

a magnetic sheet in which said domains can be propagated, a bias means for creating a magnetic field for stabilizing said domains, a plurality of propagation means for moving said domains in a plurality of information channels in response to a magnetic field in the plane of said sheet, means for producing an in-plane magnetic field, a plurality of magnetoresistive sensing elements, each of which is associated with a different one of said information channels for sensing the presence and absence of domains in said channels, wherein adjacent sensing elements have their magnetization directions in the absence of magnetic fields alternately parallel and perpendicular to the direction of current flow therein, means for providing current in said magnetoresistive sensing elements, utilization means responsive to the total voltage change across all of said magnetoresistive sensing elements.

20. The system of claim 19, wherein each sensing element has uniaxial anisotropy and a magnetic easy axis, the current in adjacent sensing elements being substantially parallel to said easy axes in one element and substantially perpendicular to the easy axis of the other sensing element.

21. The system of claim 20, wherein the easy axes of all of said elements are parallel.

22. The system of claim 19, wherein said sensing elements are comprised of permalloy.

23. The system of claim 21, wherein said sensing elements are electrically connected in series.

24. The system of claim 19, wherein there is an even number of sensing elements.

* * * * *